BREAK-IN CIRCUITRY FOR ECHO SUPPRESSORS

Filed Dec. 12, 1963 2 Sheets-Sheet 1

INVENTOR
G. K. HELDER
BY
ATTORNEY

April 11, 1967 G. K. HELDER 3,313,893

BREAK-IN CIRCUITRY FOR ECHO SUPPRESSORS

Filed Dec. 12, 1963 2 Sheets-Sheet 2

United States Patent Office 3,313,893
Patented Apr. 11, 1967

3,313,893
BREAK-IN CIRCUITRY FOR ECHO SUPPRESSORS

George K. Helder, Summit, N.J., assignor to Bell Telephone Laboratories, Incorporated, New York, N.Y., a corporation of New York Filed Dec. 12, 1963, Ser. No. 330,196
5 Claims. (Cl. 179—170.6)

Figure 1:
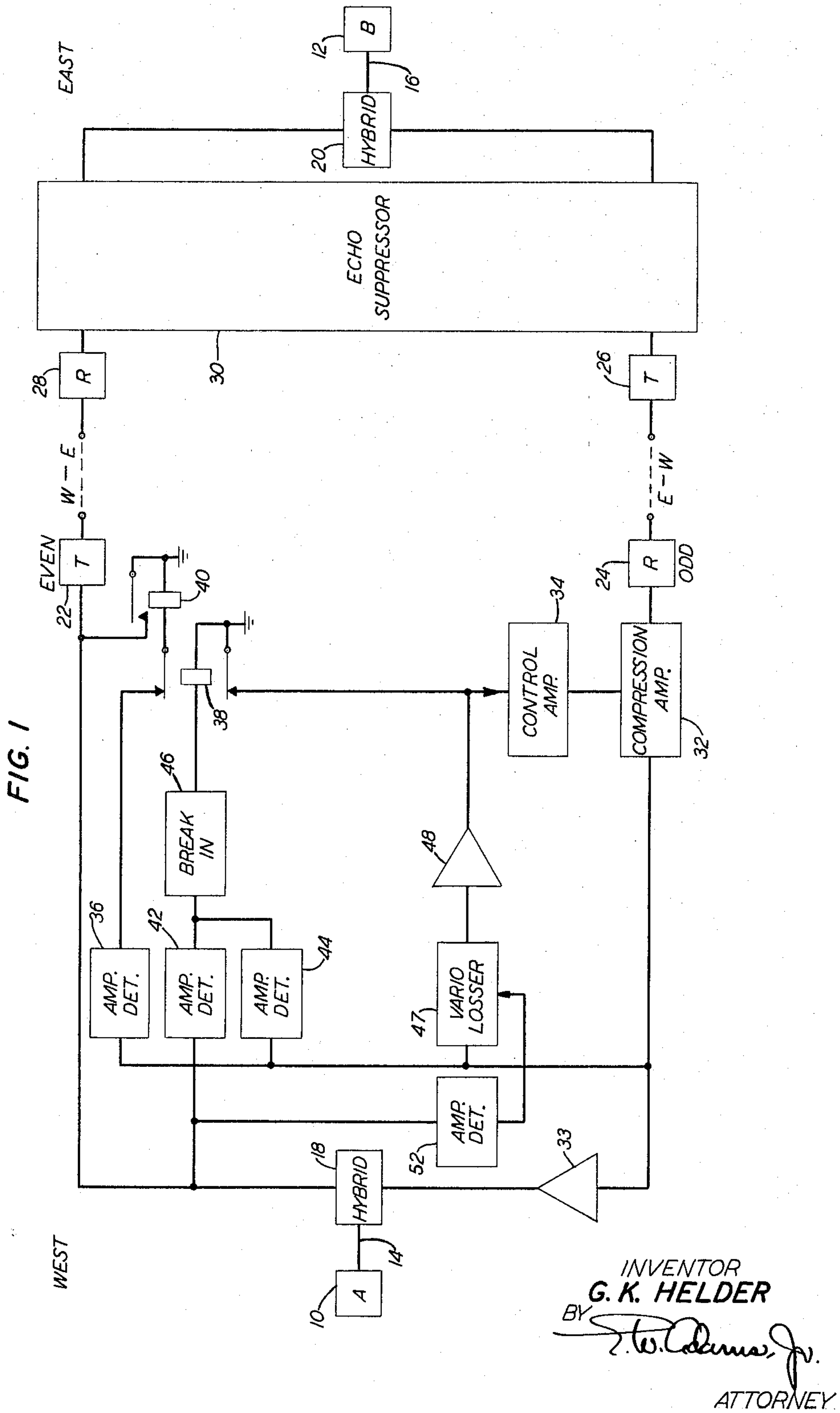

This invention relates to echo suppressors, and, more particularly, improvements in break-in circuitry for echo suppressors to be used in communication circuits having extended transmission delays.

When two-wire, two-way local circuits are associated with the terminals of a typical communication facility, such as a radio relay or a carrier system, which normally involves two one-way paths for the two directions of transmission, interfaces between two-wire and four-wire facilities occur at the terminals. Although, according to common practice, hybrid or other isolation networks are employed at the points of interconnection between the two-wire and four-wire sections of the system, the isolation so afforded is never perfect and the possibility of singing or the generation of echoes is ever present. An echo is noted, for example, when a speech signal applied to one terminal of the four-wire section of the system reaches the other terminal of the four-wire section and, rather than being abstracted in its totality by the local two-wire circuit associated with that terminal, returns in greater or lesser strength to the terminal at which the speech signal originated, there to be detected in the local circuit associated with that terminal as an echo.

In the past, various devices which may be generally classified as echo suppressors have been provided at the terminals of the four-wire communication facilities to alleviate the echo condition. Many of these devices have involved at least short circuiting, or otherwise effectively blocking the transmission path from one terminal when speech incoming from the other terminal is detected. Such interruption of the transmisison loop linking the terminals effectively blocks the circulation of echoes in the system. Such simple echo suppressor arrangements are of little practical use because normal conversations consisting of interspersed contributions by both parties are completely disrupted. As soon as one party speaks, he interrupts the talking path of the other party, who thenceforth can do nothing but listen to the first speaker.

The above problem in echo suppressors has been alleviated to a certain extent by the use of so-called break-in circuitry which typically includes arrangements for detecting the simultaneous presence of speech contributions from both speakers at the point of detection and further arrangements for removing the effective interruption of the path extending to the terminal of the first to speak, thus permitting both parties to speak simultaneously. By necessity, such break-in circuitry has also included means for reducing the level of both speakers' speech signals with the result that both speech signals and echoes are reduced materially during the condition of double talking. Too often, such break-in circuitry is useful only to alert both parties to the fact that both are attempting to talk at the same time, useful conversaion being possible only if one or the other desists long enough to permit the other to gain control of the conversation.

In the development of break-in circuitry intended to improve the utilization of the communication facility during double-talking conditions, much attention has been directed to the problem of permitting useful conversation after the near-end speaker interrupts the speech of the far-end speaker. One difficulty is caused entirely by the echoes which can return to the far-end speaker once the suppressor is disabled by the break-in circuitry. Such echoes may, if the far-end speaker is a loud talker and the near-end speaker is a weak talker, be of substantially the same magnitude when they reach the far-end terminal together and prevent comprehension of the information which the near-end speaker is attempting to convey. One solution, which forms the subject matter of my copending application, Ser. No. 323,351, filed jointly with Paul T. Brady on Nov. 13, 1963 and assigned to the assignee of the present application, involves the insertion of loss or of a compressor circuit in the speech path incoming from the distant terminal whenever break-in occurs. This reduces the echo without affecting the level of the speech from the near-end talker. Unfortunately, the reduction of echoes is accompanied by a corresponding reduction of the level of speech signals received from the far-end speaker and his message may be lost.

Another problem involves the hangover or release time chosen for the break-in circuitry. If a short hangover is used, the break-in circuit will release during pauses in the speech of the near-end speaker and the far-end speaker may then again operate the suppressor, effectively chopping portions out of the near-end speech. If a larger hangover is used, chopping is avoided by the break-in circuit preventing operation of the suppressor after double talking has ceased and this permits echoes to return to the bar end of the system.

It is accordingly the object of the present invention to improve the performance of echo suppressors, particularly during the break-in phase of operation.

The above object is accomplished according to the invention by adjusting the amount of loss or compression, introduced in the incoming path from the distant terminal when break-in occurs, in proportion to the level of the speech signals originating at the near-end terminal. When the near-end speaker is a loud talker, his speech masks echoes which are returned to the far-end terminal and the amount of loss introduced during double talking may be reduced, permitting the speech of the far-end party to reach the near-end at a reasonable level. If the near-end party speaks softly or pauses, greater loss or compression is introduced to reduce echo signals returned to the far end. This same arrangement is advantageous also in that the break-in circuit hangover may be increased to prevent chopping without permitting an inordinate amount of echo to return to the far-end terminal. Thus, when the near-end speaker pauses, the break-in circuit need not release immediately because the increased loss or compression placed in the incoming path at this time serves to hold the echo component to a tolerable level.

In accordance with the invention, therefore, break-in circuitry for a split terminal echo suppressor includes means for detecting the condition of double talking and in response to such condition both removing the suppression or short circuit applied to the outgoing speech path at a terminal when speech signals are received from the other terminal of a communication system, and, at the same time, inserting in the incoming path a loss or compressor circuit, the amount of loss or compression introduced being adjusted by the instantaneous transmitted speech level at the input to the break-in circuitry.

Figure 2:
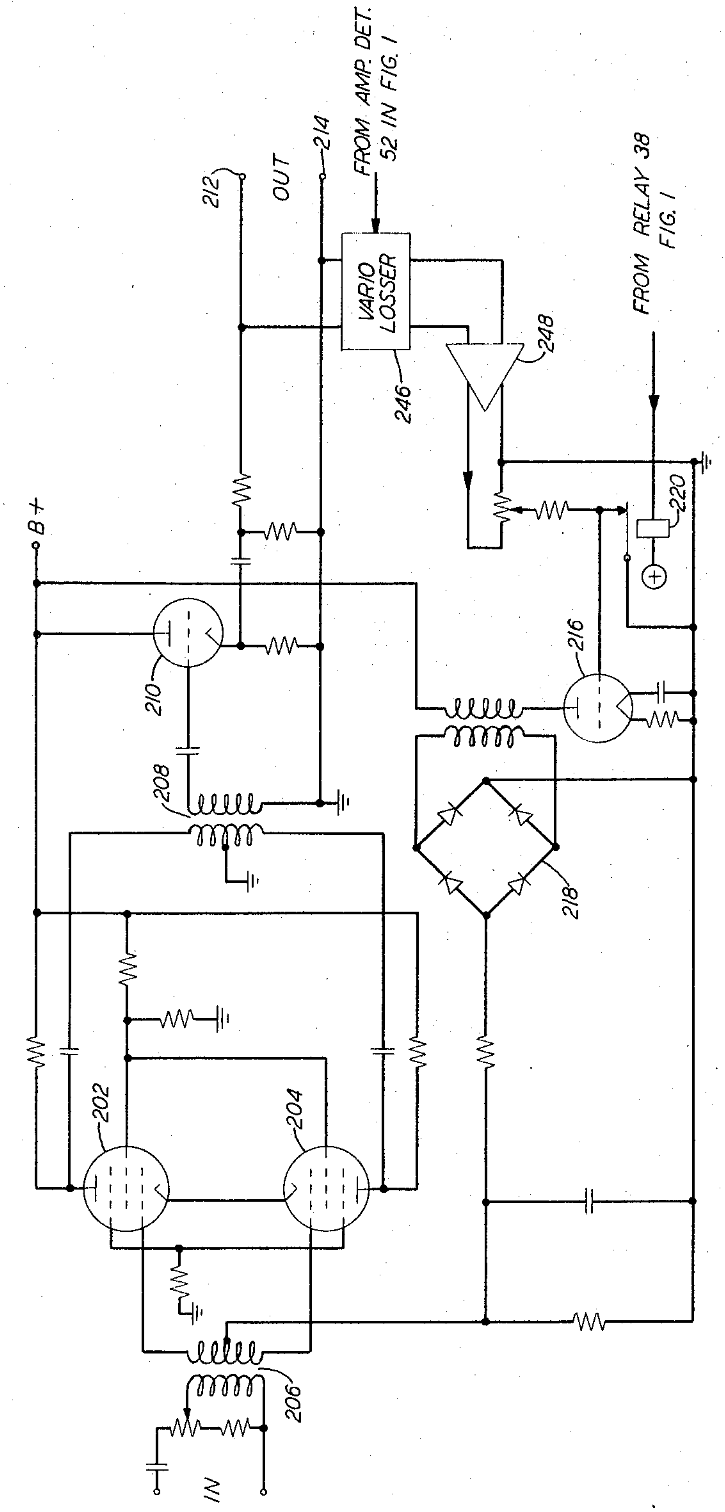

The above and other features of the invention will be described in connection with the drawings in which:

FIG. 1 is a block diagram of a communication facility including two-wire and four-wire sections and embodying a split terminal echo suppressor with break-in circuitry according to the invention, and FIG. 2 is a circuit schematic diagram of the compressor amplifier and control circuitry therefor employed in the arrangement of FIG. 1.

As shown in FIG. 1, a communication system involving the echo suppressor problem discussed above and employing echo suppressors in accordance with the invention comprises first and second local circuits 10 and 12 (identified also by the letters A and B, respectively, designating the two speakers or subscribers) which are connected to the terminals of a communication facility by two-way circuits 14 and 16, respectively, and hybrid networks, or their equivalents, 18 and 20. The communication facility may comprise a pair of one-way radio paths, a pair of carrier channels or other one-way communication channels extending between the terminals here considered for convenience and designated in the drawings as the East and West terminals of the communication facility.

Extending from hybrid 18 at the West terminal of the communication facility, for example, are transmission paths ultimately associated with a transmitter 22 and a receiver 24, while at the East terminal, the corresponding paths are associated with a receiver 26 and a transmitter 28. Thus, the two terminals are joined by a pair of one-way paths identified as the West-East, or W-E, path in the upper portion of the drawing, and the East-West, or E-W, path in the lower portion of the drawing. For convenience of description, the lower branch of the E-W path, as it appears at the output of receiver 24, may at times be referred to as associated with the ODD side of the West terminal of the communication facility, and the portion of the West-East path as it appears at the input of transmitter 22 may be referred to as associated with the EVEN side of the same terminal.

Transmitter 22 and receiver 24 at the West terminal are associated with the transmission paths extending from hybrid 18, by way of the equipment shown in block form and comprising one-half of a split terminal echo suppressor, the other half of which is located at the East terminal and is indicated generally by the large circuit block 30 in FIG. 1 of the drawing. In accordance with usual practice, the equipment at the two terminals is identical and consideration of the circuitry of the invention may be confined to the equipment provided at the West terminal which is shown in the drawings in the condition in which it is found when the circuit is at rest; that is, when neither subscriber A nor subscriber B is talking.

Under these conditions, local circuit 10, associated with hybrid 18, is connected directly to transmitter 22 in the EVEN side of the terminal and incoming signals from the distant terminal appearing at receiver 24 are connected to local circuit 10 by way of a compressor amplifier 32 and an isolation amplifier 33. Under the rest conditions herein contemplated, compressor amplifier 32, under the control of a control amplifier 34 and additional control circuitry to be considered hereinafter, produces no compression of signals traveling between receiver 24 and isolation amplifier 33.

In common with prior art echo suppressors, the echo suppressor of the invention includes facilities for interrupting or blocking the transmission path from one terminal, here the West, or near-end, terminal, whenever signals are received from the other, or far-end, terminal. These facilities include an amplifier detector 36 which abstracts a sample of the ODD-side signal received in the East-West channel and provides a direct-current output indicative of the receipt of such signal. This output is applied by way of the upper normally closed contact of break-in relay 38 to the winding of suppressor relay 40 which, when operated, completes a circuit to ground shunting the input to transmitter 22 in the EVEN side of the West terminal. Thus, it will be recognized that whenever the far-end speaker alone produces speech signals, relay 40 is operated to block the speech path extending to the far-end terminal. Under these conditions, of course, party A, the near-end subscriber, perceives speech from the far-end speaker, but the far-end speaker is spared the annoyance of hearing his own echo returned. Of course, the same interruption of the return path from the far-end speaker prevents the near-end speaker from communicating over the facility until the far-end speaker pauses and permits the suppression relay to release.

Double talking is permitted and may be accomplished by the break-in circuitry shown in FIG. 1. This circuitry functions to detect double talking; that is, to determine whether both the far-end and the near-end subscribers are speaking, to distinguish between echoes of the far-end speaker and attempted speech of the near-end speaker, and to establish conditions under which the block or short circuit should be removed from the return path to permit simultaneous two-way conversation.

The break-in circuitry includes identical elements associated with the ODD and EVEN sides of the echo suppressors and is exemplified at the West terminal by amplifier detectors 42 and 44, respectively, designed to sample signal energy in the EVEN and ODD transmission paths of the West terminal. In each instance, the sample of the signal in the relevant transmission path is abstracted and applied after amplification to a rectifier which provides a direct-current output signal. Conveniently, the rectifiers are so poled that the output signals of the two amplifier detectors 42 and 44 are in opposition. These two signals are combined in a break-in circuit 46 which may comprise a simple resistance-summing circuit, the output of which controls a threshold detector which may conveniently comprise a single diode arranged to provide an output only when the voltage appearing at the summing point of the summing circuit indicates a greater signal at the output of amplifier detector 42 associated with subscriber A at the West terminal than the amplifier detector 44 at connected speech signals from the far-end speaker.

When the threshold detector does provide an output, break-in relay 38 is operated and serves, by opening its upper normally closed contact, to remove the short circuit previously established by suppression relay 40, and, by opening of its lower normally closed contact, to remove a ground from the control circuitry of the compressor amplifier 32. This latter circuit adjustment serves, as will be considered in detail hereinafter, to adjust the operating condition of compressor amplifier 32 to insert a substantial amount of compression in the path between receiver 24 and isolation amplifier 33.

At the completion of these operations, the two speakers may talk simultaneously, the compression afforded by compressor amplifier 32 serves to insure that any echoes which might return to a loud-talking, far-end speaker through the transhybrid loss of hybrid 18 are sufficiently attenuated to prevent them from annoying the far-end speaker. On the other hand, if the far-end speaker is a weak talker, the absence of attenuation of low amplitude signals permits his speech to be heard and understood by the near-end subscriber to local circuit 10.

It will be recognized that under the conditions contemplated above, the possibility of conducting a successful conversation involving potential conditions of double talking depends upon two things. First, the amount of compression must be sufficient to prevent the return of echoes to the far-end terminal at an annoying level and, second, the amount of compression must not be so great that the incoming speech is reduced below the level of comprehension.

As shown in FIG. 1, the amount of compression afforded by compressor amplifier 32 is controlled both by the removal of ground of a control element in control amplifier 34 upon opening of the lower normally closed contact of break-in relay 38 and, also, when this relay contact is opened, by a control loop including a variolosser 47 of conventional design connected to the output of amplifier 32 and by way of amplifier 48 to the control element of compressor amplifier 34. The amount of loss in the control loop is varied by adjusting the variolosser in response to speech signals of the near-end talker. This is accomplished by sampling the speech of the near-end talker in amplifier detector 52 to provide a direct-current output for application to the variolosser. Details of this control arrangement are shown in the circuit schematic diagram of FIG. 2.

Before this diagram is considered, however, it should be understood that the break-in relay, which is, in turn, controlled by both speakers, determines the introduction of compression in the incoming signal path while the near-end speaker controls the amount of compression so introduced and continuously adjusts this quantity to insure that the echoes returned to the far-end terminal are sufficiently reduced to be masked by the speech traveling to that terminal and at the same time to minimize the reduction of the level of speech signals received at the near-end terminal of the system. The control circuitry is so arranged that the amount of compression afforded by compressor amplifier 32 depends upon the loss inserted in the control loop by variolosser 47, and the various circuit elements are interconnected in such a manner that the greater the level of speech from the near-end subscriber A, the greater the loss introduced by variolosser 47, and therefore the less compression is afforded by compressor amplifier 32. Thus, when the level of A's speech is such that so far as B, the far-end subscriber is concerned, his echo is well masked by the speech which he wishes to hear, A is permitted to hear B's speech without substantial loss. On the other hand, when A is a weak talker so that echo from B's speech may be annoying to B, a corresponding large amount of compression is introduced to reduce the amount of echo returning to B. At the same time, since A himself is speaking softly, he presumably may not be too greatly perturbed if incoming speech from the far-end of the circuit is also at a low level. Finally, since a substantial amount of compression is introduced as A's speech drops to a lower and lower level during pauses during conversation, the level of B's received speech signal is greatly reduced and may be prevented from operating the suppression relay 40 even though, because of the short break-in time, break-in relay 38 is momentarily released.

As noted above, the details of the compressor amplifier and its control circuitry are shown in FIG. 2 of the drawing. Although compressor amplifier 32 may be of any convenient design, the embodiment shown in FIG. 2 of the drawing utilizes remote cut-off pentode-type vacuum tubes 202 and 204 to control grids of which signals appearing at the output of the receiver in the ODD side of the terminal involved are applied by way of an input transformer 206. The output signals of these tubes, which are connected as a push-pull amplifier, appear across the secondary winding of an output transformer 208 and it will be understood that by adjustment of the grid bias applied to the control grids of tubes 202 and 204, this amplifier may be caused to produce a variable compression characteristic. The more negative the bias, the greater is the amount of compression. The output of the compressor amplifier is processed by a cathode follower stage 210 and appears at output terminals 212 and 214 for application to the isolation amplifier and the various amplifier detectors in the receiving branch of the control terminal in which the compressor amplifier is located.

Normally, the compressor amplifier grids are so biased that amplification without substantial compression of the signal applied through input transformer 206 is provided. It will be recalled that it is desired to switch to a condition in which compression is provided in response to the operation of break-in relay 38 in FIG. 1 of the drawing. At the same time, the amount of compression introduced is to be controlled by the level of speech of the near-end talker at the terminal in which the compressor amplifier appears. Both of these functions are accomplished through the use of a control amplifier 216 which accepts a sample of the output signal from the compressor amplifier suitably processed and provides an output signal which, after full-wave rectification by a rectifier 218, constitutes a direct-current biasing signal for application to the control grids of compressor amplifier tubes 202 and 204 by way of a center tap of the secondary winding of input transformer 206.

A sample of the output signal appearing at terminals 212 and 214 of the compressor amplifier is applied by way of a variolosser 246 and an amplifier 248 to the grid of control amplifier 216. In the absence of break-in conditions, the input to amplifier 216 is short circuited through the normally closed contacts of relay 220 so that the only bias applied to compressor amplifiers 202 and 204 is the quiescent bias selected to permit transmission without substantial compression of the incoming speech signals. When the break-in relay operates, however, the short circuit is released through the operation of relay 220 and amplifier 216 receives an input representing the speech signal which has been transmitted through the compressor amplifier, as modified by variolosser 246 and amplifier 248. The setting of variolosser 246 depends upon the level of the speech of the near-end talker as it appears at the output of amplifier detector 52 of FIG. 1 of the drawing. It will be recognized that the greater the speech level of the near-end talker, the greater the output of amplifier detector 52, the greater the loss of variolosser 246 and, consequently, the smaller the signal applied to control amplifier 216. As a result, the bias applied to the control grids of compressor-amplifier tubes 202 and 204 is less negative and the compression afforded thereby is reduced.

What is claimed is:

1. In a communication system, first and second terminals, a two-way local circuit associated with each of said terminals, first and second transmission circuits, means interconnecting said transmission and local circuits at said terminals to permit two-way transmission between said local circuits and means for suppressing echoes in said transmission despite extended delay in said transmission circuits comprising at each terminal means for detecting speech incoming to that terminal, means responsive to said detecting means for blocking the transmission circuit to the other of said terminals, break-in means, effective when speech is initiated in the associated local circuit for transmission from that terminal to the other terminal, for disabling said blocking means, loss means, means also responsive to said break-in means for inserting said loss means in the path from said other terminal, and means for varying the amount of loss so inserted to maintain a predetermined relationship between the level of speech transmitted to said other terminal and the level of echo signals returned to said other terminal during double talking.

2. In a communication system, first and second terminals, a two-way local circuit associated with each of said terminals, first and second transmission circuits, means interconnecting said transmission and local circuits at said terminals to permit two-way transmission between said local circuits and means for suppressing echoes in said transmission despite extended delay in said transmission circuits comprising at each terminal means for detecting speech incoming to that terminal, means responsive to said detecting means for opening the transmission circuit to the other of said terminals, break-in means effective when speech is initiated in the local circuit associated with that terminal for disabling the circuit opening means, loss means, means responsive to said break-in means for inserting said loss means in the signal path from the other terminal and means for varying the amount of loss so inserted in proportion to the level of speech signals originating in said local circuit.

3. In a communication system, first and second terminals, a two-way local circuit associated with each of said terminals, first and second transmission circuits, means interconnecting said transmission and local circuits at said terminals to permit two-way transmission between said local circuits and means for suppressing echoes in said transmission despite extended delay in said transmission circuits comprising at each terminal means for detecting speech incoming to that terminal, means responsive to said detecting means for blocking the transmission circuit to the other of said terminals, a break-in circuit effective when double talking occurs for disabling the circuit blocking means, an amplifier having an adjustable compression characteristic, means responsive to said break-in circuit for effectively connecting said amplifier in the path from the other terminal, and means responsive to the level of speech signals originating in said associated local circuit for adjusting the amount of compression afforded by said amplifier, said adjustment being automatically settable to more than two discrete levels.

4. In a communication system, first and second terminals, a two-way local circuit associated with each of said terminals, first and second transmission circuits, means interconnecting said transmission and local circuits at said terminals to permit two-way transmission between said local circuits and means for suppressing echoes in said transmission despite extended delay in said transmission circuits comprising at each terminal means for detecting speech incoming to that terminal, means responsive to said detecting means for blocking the transmission circuits from that terminal to the other of said terminals, a break-in circuit responsive to the initiation of speech in the local circuit associated with that terminal for disabling the circuit blocking means, an adjustable loss means, means responsive to said break-in circuit for inserting said loss means in the path incoming from said other terminal, detecting means for producing an output which varies with the level of speech signals originating in said associated local circuit, and means for adjusting said loss means to provide loss which varies inversely with variations in the output of said detecting means.

5. In a communication system, first and second terminals, a two-way local circuit associated with each of said terminals, first and second transmission circuits, means interconnecting said transmission and local circuits at said terminals to permit two-way transmission between said local circuits and means for suppressing echoes in said transmission despite extended delay in said transmission circuits comprising at each terminal first and second detecting means for detecting speech incoming to that terminal, third and fourth detecting means for detecting speech originating in the local circuit for transmission from that terminal, means responsive to the output of said first detecting means for blocking the transmission path to the other terminal, means effective when the output of the third detecting means exceeds that of said second detecting means for disabling the blocking means, an adjustable loss circuit, means effective when said blocking means is disabled for inserting said loss circuit in the speech path from said other terminal and means responsive to said fourth detecting means for adjusting said loss circuit to provide loss inversely proportional to the level of speech signals transmitted to said other terminal.

References Cited by the Examiner

UNITED STATES PATENTS 3,215,789 11/1965 Hunter et al. ------ 179—170.6

KATHLEEN H. CLAFFY, *Primary Examiner.*

H. ZELLER, *Assistant Examiner.*